(12) United States Patent
Wilson

(10) Patent No.: US 7,293,792 B2
(45) Date of Patent: Nov. 13, 2007

(54) TRANSPORTABLE CHILD BOOSTER SEAT/CARRYING BAG

(76) Inventor: Zachary C. Wilson, 370 E. 17th St., Lombard, IL (US) 60148

( * ) Notice: Subject to any disclaimer, the term of this patent is extended or adjusted under 35 U.S.C. 154(b) by 0 days.

(21) Appl. No.: 11/094,967

(22) Filed: Mar. 31, 2005

(65) Prior Publication Data
US 2006/0226636 A1 Oct. 12, 2006

(51) Int. Cl.
*B62B 7/12* (2006.01)

(52) U.S. Cl. .................. 280/647; 280/648; 280/649; 280/47.34; 280/658; 280/30; 280/650; 280/651

(58) Field of Classification Search ........ 280/647–657, 280/642, 47.38, 47.4, 87.051, 47.34, 658, 280/30
See application file for complete search history.

(56) References Cited

U.S. PATENT DOCUMENTS

| | | | | |
|---|---|---|---|---|
| 1,240,964 A | * | 9/1917 | Frank | 108/126 |
| 2,042,326 A | * | 5/1936 | Weed | 108/130 |
| 2,990,190 A | * | 6/1961 | Eriksen | 280/30 |
| 3,290,050 A | * | 12/1966 | Ezquerra | 280/30 |
| 4,463,984 A | * | 8/1984 | Molnar | 297/250.1 |
| 4,720,029 A | * | 1/1988 | Varanakis | 224/155 |
| 4,747,526 A | * | 5/1988 | Launes | 224/155 |
| 4,832,354 A | * | 5/1989 | LaFreniere | 280/30 |
| 4,902,026 A | * | 2/1990 | Maldonado | 280/30 |
| 5,022,669 A | * | 6/1991 | Johnson | 280/30 |
| 6,367,821 B2 | * | 4/2002 | Thiele | 280/30 |
| 6,616,226 B2 | * | 9/2003 | Yanagihara | 297/250.1 |
| 6,729,630 B2 | * | 5/2004 | Szmidt et al. | 280/47.25 |
| 6,976,685 B1 | * | 12/2005 | King et al. | 280/30 |
| 2003/0192925 A1 | | 10/2003 | Boone | |
| 2004/0074937 A1 | | 4/2004 | Thomas | |

\* cited by examiner

*Primary Examiner*—Christopher P. Ellis
*Assistant Examiner*—Cynthia F. Collado
(74) *Attorney, Agent, or Firm*—Greer, Burns & Crain, Ltd.

(57) ABSTRACT

A transportable booster seat and optional carrying bag are provided. The booster seat has a seat cushion, optional arms on respective sides of the seat cushion, wheels beneath the booster seat in the rear area of the booster seat, and a retractable handle in or adjacent the bottom of the booster seat, extendable in and out of the front area of the booster seat. The carrying bag has at least one storage compartment, a top strap adapted fit over the retractable handle of the booster seat, and optional side straps adapted for securement to the arms of the booster seat.

8 Claims, 2 Drawing Sheets

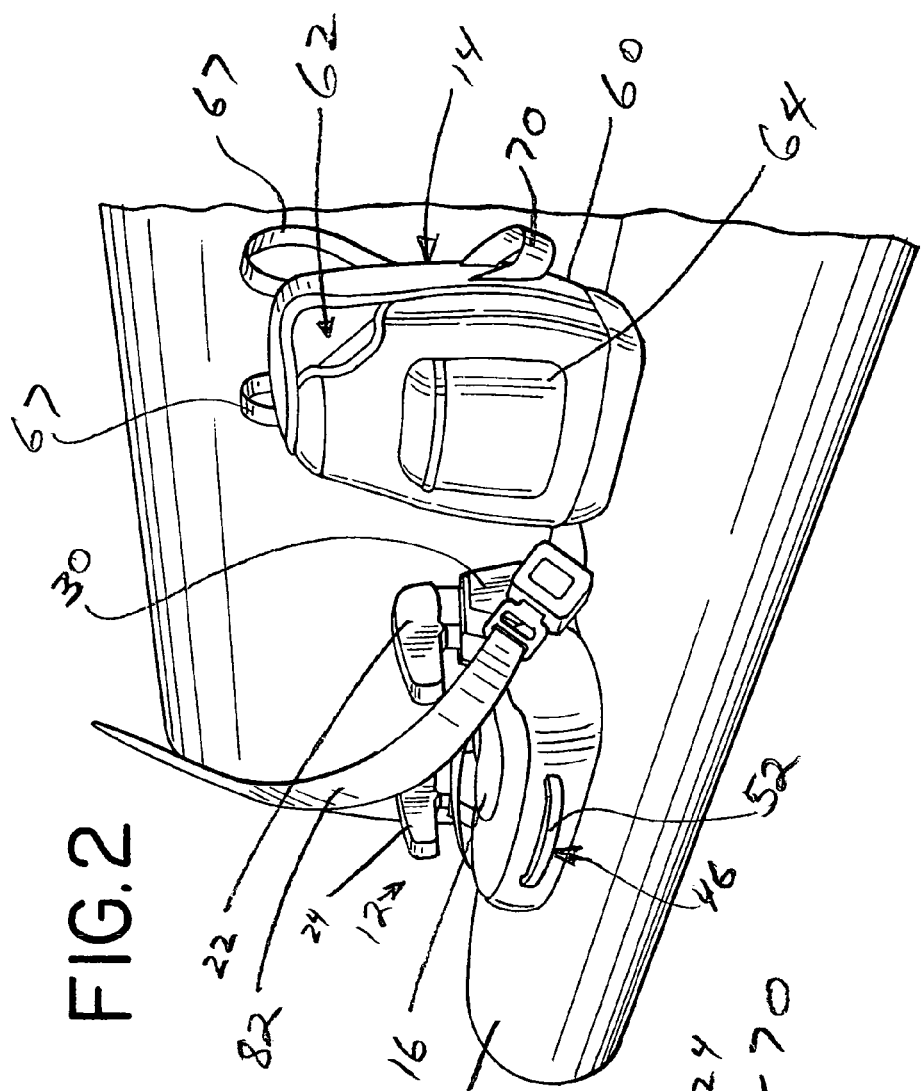
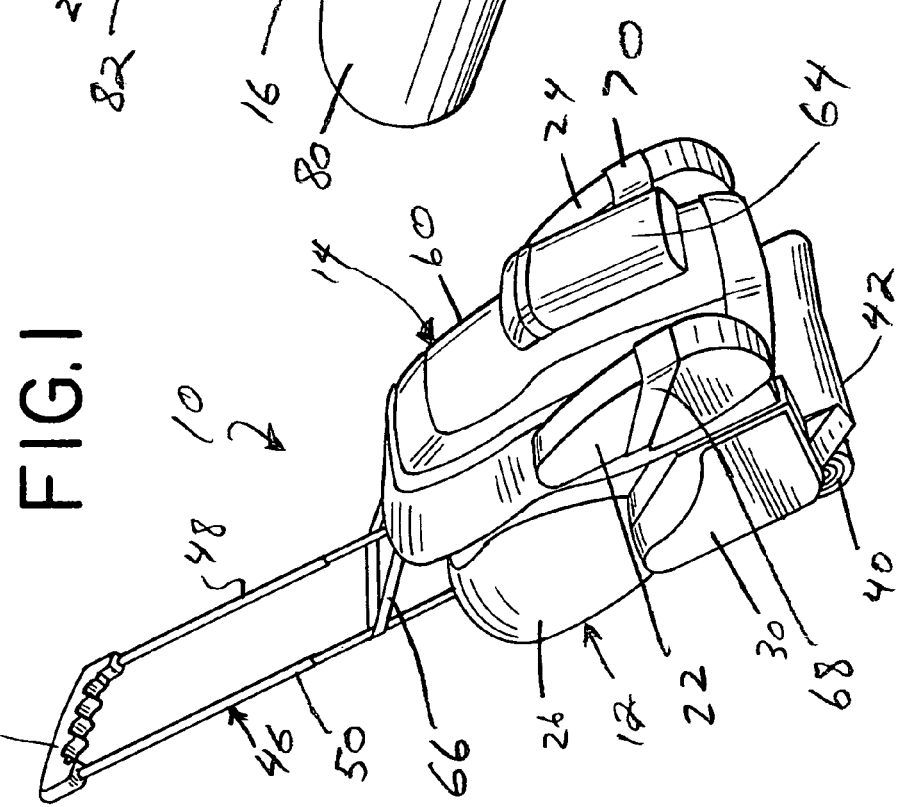

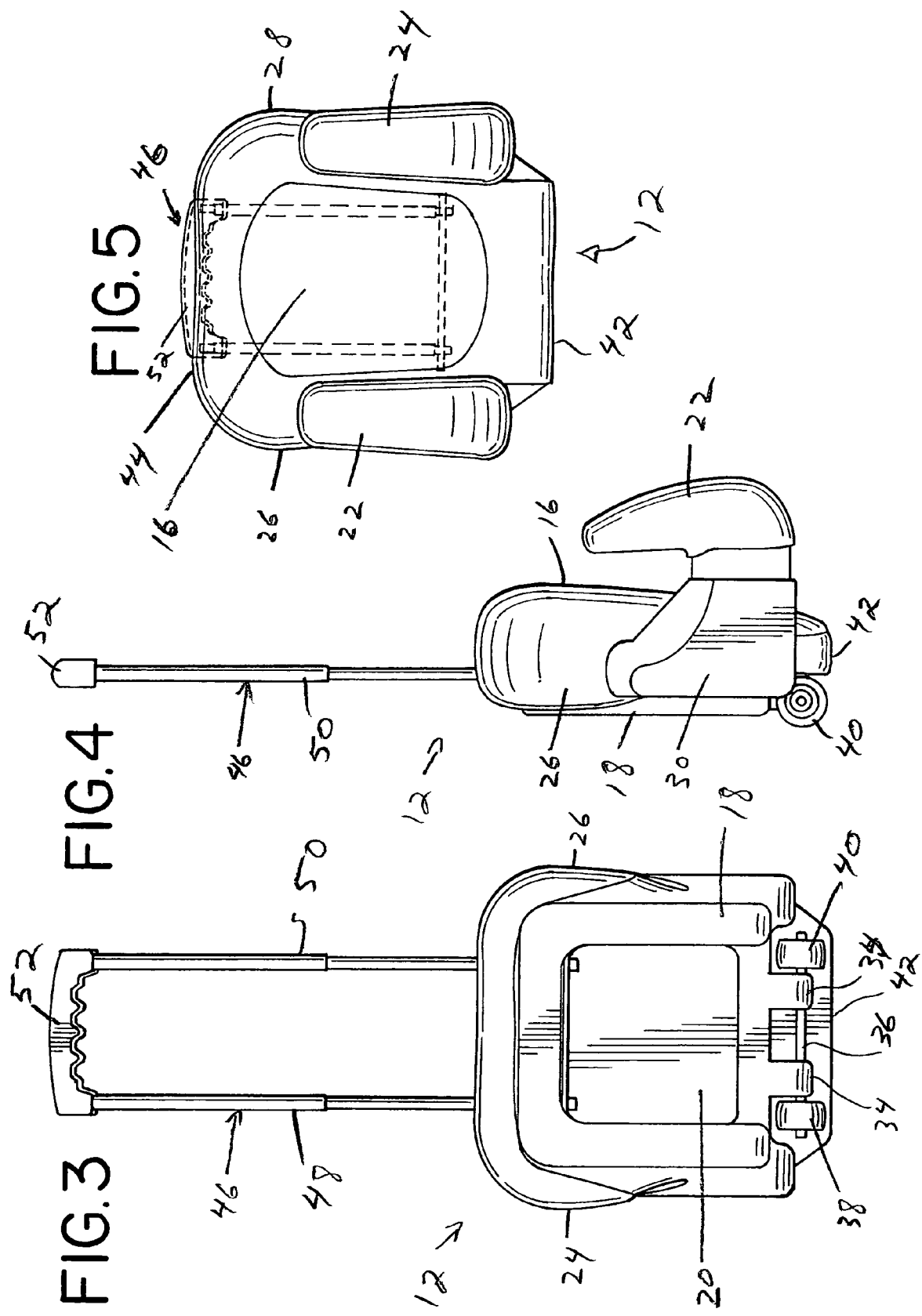

TRANSPORTABLE CHILD BOOSTER SEAT/CARRYING BAG

BACKGROUND OF THE INVENTION

Booster seats are commonly used to seat children in automobiles and airplanes, primarily for safety purposes. A typical booster seat rests on a conventional car or airplane seat, and is secured to the seat with a safety belt. With some booster seats, the child is also secured by the vehicle safety belt. However, transporting a child's car seat outside of the vehicle is cumbersome and difficult, particularly when carrying the child and items such as toys, diapers, books, etc. Thus, there is a need for more easily transportable booster seats. There is also a need for improved ways to transport travel items with the booster seat.

Accordingly, one object of this invention is to provide new and improved transportable booster seats.

Another object is to provide new and improved booster seats having a carrying bag for storing travel items.

SUMMARY OF THE INVENTION

In keeping with one aspect of this invention, a transportable booster seat is provided. The booster seat has a seat cushion on top of the seat, and can have arms on respective sides of the seat adjacent the seat cushion, if desired. Wheels are provided beneath the seat in the rear area, and a retractable handle is located in or adjacent the bottom of the seat. The handle is extendable in and out of the front area of the seat.

A carrying bag can be included, if desired. The carrier has at least one storage compartment, a top strap adapted to fit over the retractable handle of the booster seat, and side straps adapted for securement to arms of the booster seat, if desired.

BRIEF DESCRIPTION OF THE DRAWINGS

The above mentioned and other features of this invention and the manner of obtaining them will become more apparent, and the invention itself will be best understood by reference to the following description of an embodiment of the invention taken in conjunction with the accompanying drawings, in which:

FIG. 1 is a perspective view of a transportable booster seat/carrying bag combination made in accordance with the present invention;

FIG. 2 is a perspective view of the booster seat and carrying bag of FIG. 1, showing the booster seat installed on a car seat, and the carrying bag detached from the booster seat;

FIG. 3 is a plan view of the bottom of the booster seat of FIG. 1, with the handle extended;

FIG. 4 is a side view of the booster seat of FIG. 1, also showing the handle extended; and FIG. 5 is a top view of the booster seat of FIG. 1, showing the handle retracted.

DETAILED DESCRIPTION

As seen in FIG. 1, a transportable booster seat/carrying bag combination 10 includes a booster seat 12 and an optional carrying bag 14. The booster seat 12 has a seat cushion 16 (FIG. 5) on the top area of the booster seat 12, and a hard bottom support 18 (FIG. 3) on the bottom of the seat 12, opposite the seat cushion 16. Appropriate cushioning material is provided inside the booster seat between the seat cushion 16 and the bottom 18. As seen in FIG. 3, the bottom support 18 can include an opening 20, which reduces the weight of the seat, and makes the seat more comfortable in use.

The booster seat 12 can also have arms 22, 24 (FIG. 5) on sides 26, 28 of the booster seat, respectively, if desired. The side arms 22, 24 can be movable, if desired, or fixed, as in the embodiment being described. The side arms 22, 24 are supported by side structures 30, 32, which in turn are secured to the bottom support 18. The side structures 30 and bottom support 18 can made of be any suitable material, such as plastic. The support structures can be formed in one or more pieces.

The bottom support 18 (FIG. 3) has two spaced protrusions 34 having openings (not shown) for an axle 36. Wheels 38, 40 are attached to the axle 36 in a rotatable manner. The wheels 38, 40 are located adjacent a back end 42 of the booster seat, and are arranged adjacent the bottom support 18 of the booster seat so that when the booster seat is tilted in the manner shown in FIG. 1, it can be pulled on the wheels 38, 40.

On a front end 44 of the booster seat, a retractable handle 46 is provided. The handle 46 includes two telescoping arms, 48, 50, and a top handle 52 which secures the upper ends of the side arms 48, 50. The lower end of the handle 46 is secured in the seat 12 by a rod 53 or any other suitable structure.

The top handle 52 provides a convenient handle for pulling the booster seat 12, alone or in combination with the carrying bag 14. The handle 46 can be easily pulled out of the booster seat, as in FIGS. 1, 3 and 4, or pushed inside the booster seat, as in FIGS. 2 and 5. The handle can be located on the outside of the bottom of the booster seat, if preferred.

The carrying bag 14 includes an outer shell 60 that forms at least one storage compartment 62. One or more zippered pockets 64 can be provided, as desired. The storage compartment 62 is designed to carry books, diapers, toys and other items typically needed with traveling children.

The carrying bag 14 also has a top strap 66, which is adapted to fit over the handle 46 when the carrying bag is attached to the booster seat 12. The strap 66 can be made of elastic material, or non-elastic material, but preferably can be used to carry the bag when desired. Shoulder straps 67 can also be provided for carrying purposes, if desired.

The carrying bag 14 also has two optional side straps 68, 70, which are adapted to fit over the arms 22, 24 of the booster seat 12, which are also optional. The straps 68, 70 can also be made of elastic material, if desired, and are sized to further secure the carrying bag 14 to the booster seat 12, in addition to the securement function provided by the top strap 66.

In FIG. 1, the carrying bag 14 is secured to the booster seat 12 for transporting the seat/bag combination 10. The handle 46 is shown extended, and the combination 10 is tilted, as it would be when the apparatus is pulled by a user. Among other things, it can be seen that the side arms 48, 50 hold the bag 14 laterally, and the side straps 68,70 provide further stability. Even a toddler could pull the apparatus 10 through an airport terminal or the like.

In FIG. 2, the booster seat 12 is shown secured to a car seat 80 by a vehicle safety belt 82. The handle 46 is retracted, of course, and the carrying bag 14 is placed on the seat 80 next to the booster seat 12.

While the principles of the invention have been described above in connection with specific apparatus and applications, it is to be understood that this description is made only by way of example and not as a limitation on the scope of the invention.

What is claimed is:

1. Transportable booster seat apparatus comprising:
   a seat cushion on a top of a booster seat,
   wheels secured on or adjacent a bottom of the booster seat, the wheels being located near a rear area of the booster seat, and
   a retractable handle secured in or adjacent the bottom of the seat, and extendable in and out of a front area of the booster seat so that the front area of the booster seat can be lifted and the apparatus can be moved on the wheels when the handle is extended,
   the booster seat apparatus further comprising a carrying bag having at least one storage compartment and a top strap adapted to fit over the retractable handle of the booster seat when the handle is extended.

2. The apparatus of claim 1, wherein the booster seat has arms on respective sides of the booster seat adjacent the seat cushion, and the carrying bag has side straps adapted for securement to the arms of the booster seat.

3. The apparatus of claim 1, wherein the booster seat has arms on respective sides of the booster seat.

4. The apparatus of claim 3, wherein the bottom has a bottom support, and the bottom support has two spaced protrusions and an opening between the protrusions, the booster seat further having an axle extending through the openings, and the wheels being secured to the axle for rotation.

5. The apparatus of claim 4, wherein the side arms are supported by side structures, which in turn are secured to the bottom support.

6. The apparatus of claim 5, wherein the side arms are fixed.

7. The apparatus of claim 1, wherein the retractable handle has two telescoping arms and a top handle.

8. Transportable booster seat apparatus comprising:
   a seat cushion on a top of a booster seat,
   wheels secured on or adjacent a bottom of the booster seat, the wheels being located near a rear area of the booster seat, and
   a retractable handle secured in or adjacent the bottom of the seat, and extendable in and out of a front area of the booster seat so that the front area of the booster seat can be lifted and the apparatus can be moved on the wheels when the handle is extended,
   the booster seat apparatus further comprising a carrying bag;
   wherein the booster seat has arms on respective sides of the booster seat adjacent the seat cushion, and the carrying bag has side straps adapted for securement to the arms of the booster seat.

* * * * *